(12) United States Patent
Stanley et al.

(10) Patent No.: US 7,692,555 B2
(45) Date of Patent: Apr. 6, 2010

(54) POWERING A WIRELESS SYSTEM FROM PREEXISTING POWER

(75) Inventors: Gerald R. Stanley, Osceola, IN (US); Blake Augsburger, Mishawaka, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 913 days.

(21) Appl. No.: 11/499,355

(22) Filed: Aug. 4, 2006

(65) Prior Publication Data
US 2008/0030075 A1 Feb. 7, 2008

(51) Int. Cl.
*G08C 19/00* (2006.01)
(52) U.S. Cl. .............................. 340/825.72; 340/539.1; 362/233; 362/85; 700/19; 700/22
(58) Field of Classification Search ................................
340/310.11–310.18, 825.72; 307/11; 700/20, 700/19, 22; 362/89–91, 109–120, 33, 92–94, 362/145–153.1, 233, 85
See application file for complete search history.

(56) References Cited

U.S. PATENT DOCUMENTS

| | | | |
|---|---|---|---|
| 3,466,652 A | | 9/1969 | Heyser |
| 4,279,019 A | | 7/1981 | Heyser |
| 5,121,287 A | * | 6/1992 | Lee .............................. 361/600 |
| 5,432,500 A | * | 7/1995 | Scripps ........................ 340/628 |
| 5,793,874 A | * | 8/1998 | Camire .......................... 381/57 |
| 5,980,057 A | * | 11/1999 | Christie ........................ 362/86 |
| 6,211,581 B1 | * | 4/2001 | Farrant ......................... 307/117 |
| 6,215,885 B1 | | 4/2001 | Geiger |
| 6,608,907 B1 | | 8/2003 | Lee |
| 6,888,315 B1 | * | 5/2005 | Hsiao .......................... 315/149 |
| 7,253,732 B2 | * | 8/2007 | Osann, Jr. .................... 340/541 |
| 7,460,006 B2 | * | 12/2008 | Kates ....................... 340/425.1 |
| 2001/0043145 A1 | * | 11/2001 | Jacobson, Jr. ........... 340/825.72 |
| 2003/0197807 A1 | * | 10/2003 | Wu .............................. 348/375 |
| 2004/0138768 A1 | * | 7/2004 | Murray et al. ................. 700/90 |
| 2005/0078837 A1 | | 4/2005 | Hornback |
| 2005/0267605 A1 | * | 12/2005 | Lee et al. ....................... 700/19 |
| 2006/0044789 A1 | * | 3/2006 | Curtis ......................... 362/152 |
| 2006/0097890 A1 | * | 5/2006 | Atkins .................... 340/825.72 |
| 2006/0161270 A1 | * | 7/2006 | Luskin et al. ................. 700/22 |
| 2007/0222631 A1 | * | 9/2007 | Haase ...................... 340/691.5 |

* cited by examiner

*Primary Examiner*—Brian A Zimmerman
*Assistant Examiner*—Ryan W Sherwin
(74) *Attorney, Agent, or Firm*—Brinks Hofer Gilson and Lione (57) ABSTRACT

A system is described for powering a wirelessly controlled electric system, such as a sound or security system, via a preexisting power source within an existing building structure. The wirelessly controlled electric system may receive power from the preexisting power source via an adaptor that may be inserted between the preexisting power source and at least one preexisting electric device. The wirelessly controlled electric system may also include a switch for directing the supply of power from the preexisting power source to the preexisting electric device. An electric system controller may direct the operation of the wirelessly controlled electric system. The electric system controller may also direct the switch between a conducting and a non-conducting state to supply power from the preexisting power source to the preexisting electric device.

29 Claims, 8 Drawing Sheets

POWERING A WIRELESS SYSTEM FROM PREEXISTING POWER

BACKGROUND OF THE INVENTION

1. Technical Field

This invention relates to providing power to wirelessly controlled electric systems. More particularly, this invention relates to powering a wirelessly controlled electric system from a preexisting power source.

2. Related Art

Electric systems such as sound and security systems are frequently added to existing building structures for both domestic and industrial use. These systems oftentimes employ wireless methods to inexpensively and conveniently transfer control signal information. Wireless communication enables the electric systems to be more versatile in their placement during installation. Wireless communication, however, cannot efficiently transfer significant amounts of energy. Thus, power wires must be provided to these systems for them to work properly.

Existing building structures typically do not have the necessary wiring routed to the areas where it would be opportune to place the sound or security systems. These systems generally require line of sight operation for best results. As such, these systems are oftentimes suspended from the ceiling or other upper level areas of the building structure. Installing the necessary power wiring to these upper level areas may be costly, both for its material content and the labor involved. Typically, the installation must be performed by an electrical contractor and the wiring must be routed behind the wall and/or ceiling. Therefore, there is a need for an inexpensive and convenient system for providing power to these electric systems installed in existing building structures.

SUMMARY

This invention provides a system for powering a wirelessly controlled electric system utilizing preexisting power within a building structure. Buildings often have preexisting electric devices such as lighting in or near the ceiling or other upper level locations where it would be opportune to place these systems. The wirelessly controlled electric system parasitically utilizes the power supplied to these preexisting electric devices, while maintaining the user's control over the power supplied to these devices. This may be accomplished by an adaptor that is electrically adapted to be coupled to the preexisting power source. The wirelessly controlled electric system may be coupled to the adaptor to receive power from the preexisting power source via the adaptor. The preexisting electric device may also be coupled to the adaptor. The wirelessly controlled electric system includes a power switch that may control the power to the preexisting electric device. The wirelessly controlled electric system may be directed via wireless control signals from an electric system controller.

The system may also preserve the power control of the preexisting electric device from the original location of a preexisting switch. Preexisting switches are generally located in a building where it would be opportune for a user to control the power to the electric device that is wired to the switch. A typical location is on a wall that is easily accessible by the user. With the installation of the system, however, the preexisting switch must be placed in a conducting state in order for the wirelessly controlled electric system to receive power from the preexisting power source. To avoid losing switching capabilities at this location, the system may provide an additional wireless switch.

The wireless switch enables the user to control the power of both the wirelessly controlled electric system and the preexisting electric device, independently. The wireless switch may be in direct wireless communication with the wirelessly controlled electric system to wirelessly direct the power switch. Alternatively, the wireless switch may be in indirect wireless communication with the wirelessly controlled electric system via the electric system controller, such that a wireless signal is transmitted from the wireless switch to the electric system controller and then transmitted from the electric system controller to the wirelessly controlled electric system. Either way, the user may install the system and retain power control of the preexisting electric device in the location of the preexisting switch via the additional wireless switch. The wireless switch may be adapted to cover the preexisting switch, or the wireless switch may be placed in a separate location away from the preexisting switch.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
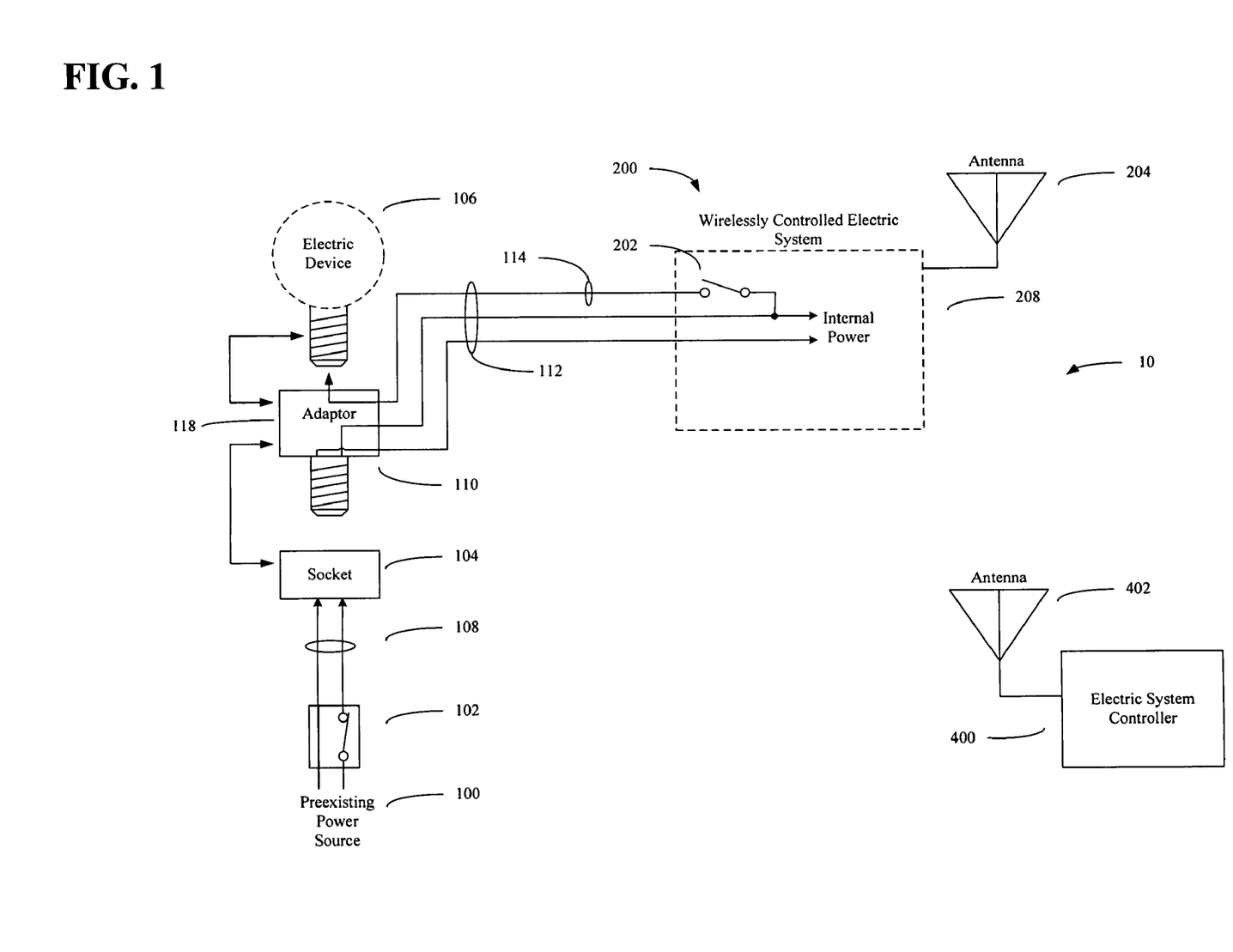
FIG. 1 provides a simplified view of one example of a system for powering a wireless system from preexisting power.

An example of a system 10 for powering a wireless system from preexisting power is shown in FIG. 1. The system 10 is adapted to parasitically utilize the power from a preexisting power source 100. The system 10 includes an adaptor 110, a wirelessly controlled electric system 200, and an electric system controller 400. The wirelessly controlled electric system 200 is coupled to the adaptor 110 and the adaptor 110 is electrically adapted to be coupled to the preexisting power source 100. The wirelessly controlled electric system 200 receives power from the preexisting power source 100 via the adaptor 110. The electric system controller 400 directs the wirelessly controlled electric system 200 via wireless control signals so that a user may control the operations of the wirelessly controlled electric system 200 via the electric system controller 400.

Figure 2:
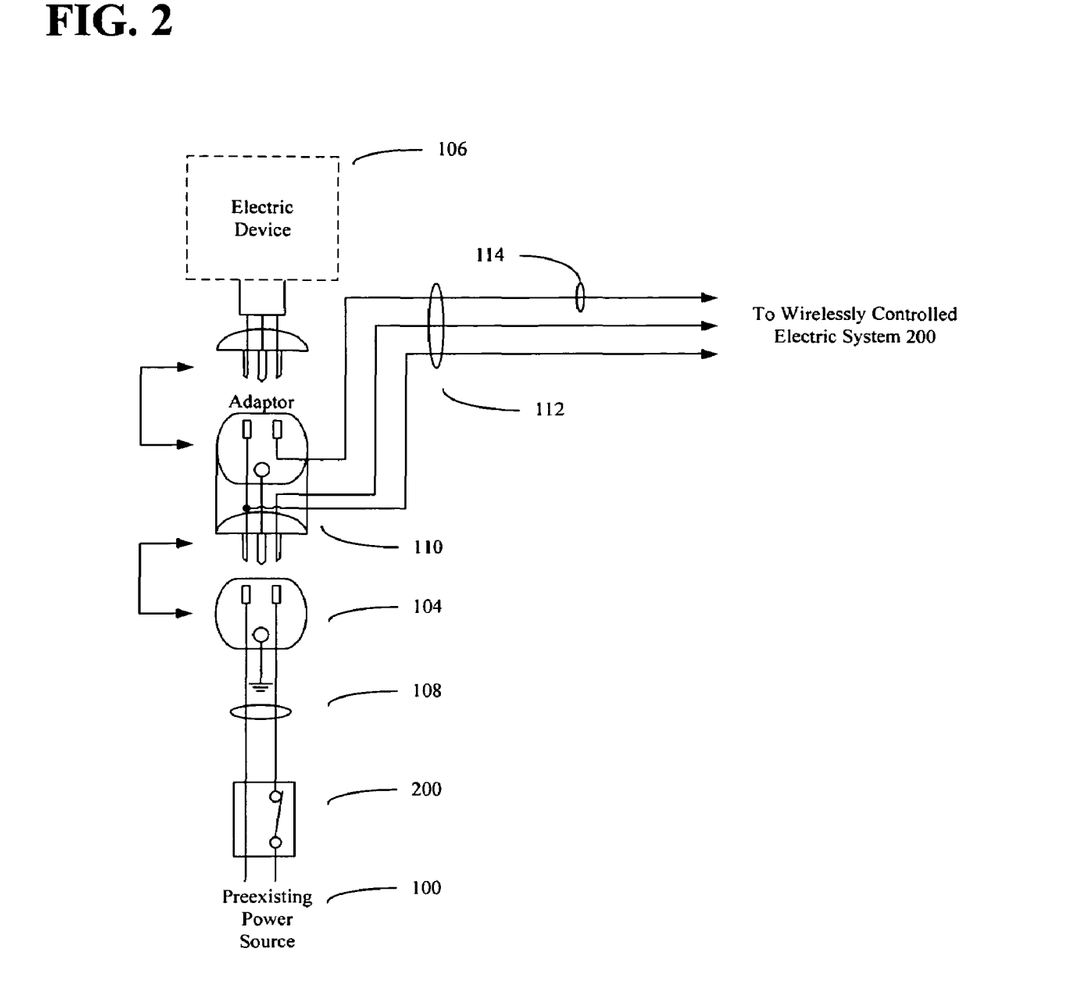
FIG. 2 is an illustration of an exemplary adaptor.
Figure 3:
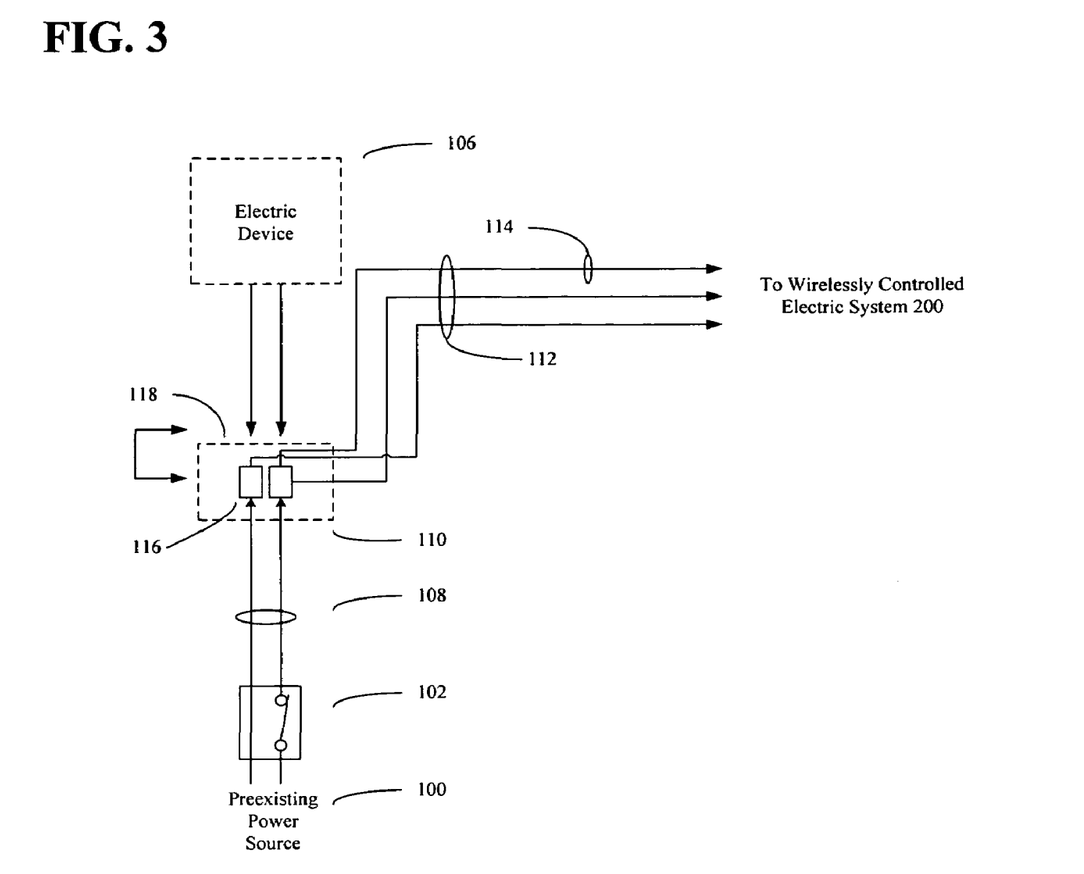
FIG. 3 is an illustration of an exemplary adaptor.

As shown in FIGS. 1, 2, and 3, the preexisting power source 100 includes power wiring 108. The power wiring 108 may create a preexisting electrical circuit (not shown) where the circuit may include a preexisting switch 102 and at least one preexisting electric device 106 powered by the preexisting power source 100 through the preexisting switch 102. The preexisting switch 102 may include any device for making, breaking, or changing the connections in the preexisting electrical circuit. For example, the preexisting switch 102 may include a toggle switch, a push-button switch, a dimmer switch, or other switches. The preexisting switch 102 may be mounted on a wall or other supporting structure where it may be accessible by a user.

The user may selectively power the electric device 106 by actuating the preexisting switch 102. The electric device 106 may include any device that is powered with electricity. For example, the electric device 106 may include a light generation source, a sensing device, an intercom system, a powered loudspeaker, a security system, a camera or other monitoring device, a microphone, a scanning device, or other electric device(s). The electric devices 106 are oftentimes located in the upper level areas of building structures.

In the example of FIG. 1, the preexisting power source 100 is shown with power wiring 108 coming out of a preexisting switch 102 and leading into a socket 104. The socket 104 may include any cavity for fitting and connecting to the electric device 106. For example, in FIG. 1, the socket 104 is shown as a light socket and the electric device 106 is shown as a light generation source. The light socket (socket 104) serves to connect the light generation source (electric device 106) to the preexisting power source 100. The socket 104 may also include a female or male electrical fitting, as shown in the example of FIG. 2 where the socket 104 is a female receptacle. Thus, where the electric device 106 includes an electrical plug, the female receptacle (socket 104) receives the plug and connects the electric device 106 to the preexisting power source 100. The socket 104 may therefore provide a convenient access point for the adaptor 110 to adapt into the preexisting electrical circuit.

The adaptor 110 may be electrically adapted to be coupled to the preexisting power source 100 by disconnecting the electric device 106 from the preexisting power source 100 and inserting the adaptor between the electric device 106 and the preexisting power source 100. For example, in FIG. 1, the adaptor 110 includes a first end that is adapted to be coupled to a light socket (socket 104) and a second end that is adapted to be coupled to a light generation source (electric device 106). After the light generation source (electric device 106) is disconnected from the preexisting power source 100, the adaptor 110 may be screwed into the light socket (socket 104) and the light generation source (electric device 106) may be screwed into the adaptor 110. In the example of FIG. 2, the adaptor 110 includes a first end that is adapted to be coupled to an electric receptacle (socket 104) and a second end that is adapted to receive a plug of the electric device 106. After the plug is disconnected from the preexisting power source 100, the adaptor 110 may be plugged into the receptacle (socket 104) and the electric device 106 may be plugged into the adaptor 110. In these examples, the adaptor 110 may be inserted between the socket 104 and the electric device 106. The adaptor 110 may also be installed without the use of mechanical tools to allow for simple installation. Moreover, the adaptor 110 may be electrically adapted to be coupled to a preexisting power source 100 utilizing domestic voltages; however, industrial voltages may also be utilized.

In the example of FIG. 3, the preexisting power source 100 is shown without a socket 104. Rather, the power wiring 108 leads directly into the electric device 106. The adaptor 110 may be adapted to be coupled to the preexisting power source 100 by intercepting the power wiring 108 and joining two or more power wires to make a circuit for electricity to flow. This is commonly called splicing. In FIG. 3, the adaptor 110 is shown as having two connectors 116 that may be used to splice into the power wires 108 of the preexisting electrical circuit. The adaptor 110 may also be adapted to be coupled at the point where the wire terminates into the electric device 106, such as in a terminal box of a light generation source.

Because the adaptor 110 may be inserted between the preexisting power source 100 and the electric device 106, the power supplied by the preexisting power source 100 passes through the adaptor 110. The appropriate current carrying and thermal capacity materials may therefore be used in the construction of the adaptor 110. For example, high temperature materials may be used for an adaptor 110 carrying current for high-power electric devices 106. Also, the appropriate thickness of conductive material may be used to support the electric circuit in which the adaptor 110 will be used. For example, if wiring is used in the construction of the adaptor 110, then the appropriate gauge may be used to support the required current capacity. In this case, the gauge of wiring used with the adaptor 110 may typically match the gauge of power wiring 108 leading to the electric device 106.

In the example of FIG. 1, the adaptor 110 and the wirelessly controlled electric system 200 are electrically connected by at least three connecting wires 112. The adaptor 110 and the wirelessly controlled electric system 200 may be part of a single housing or may be separate housings (118, 208), as shown in the example in FIG. 1. Moreover, in addition to wiring, the adaptor 110 and the wirelessly controlled electric system 200 may be electrically connected by other electrically conductive material(s). A connector (not shown) may also be located between the adaptor 110 and the wirelessly controlled electric system 200 for electrically connecting the two. The wirelessly controlled electric system 200 may be electrically coupled with the adaptor 110 via the connecting wires 112 or other electrically conductive material(s) to receive power from the preexisting power source 100.

Moreover, two or more wirelessly controlled electric systems 200 may be coupled with the adaptor 110 to receive power from the preexisting power source 100, within the power supply constraints of the preexisting power source 100. Alternatively, a single wirelessly controlled electric system 200 may be coupled with two or more adaptors 110 to receive power from two or more preexisting power sources 100. The two or more adaptors 110 may receive power from two or more different preexisting power sources 100 if, for example, more power is needed to drive the wirelessly controlled electric system 200.

The wirelessly controlled electric system 200, shown in FIG. 1, may include a sound system, a security system, or other systems or a combination of the systems. For example, the sound system may be a powered loudspeaker or other device used in connection with generating acoustic waves. The security system may be a monitoring device, a sensing device, an audio input device, a scanning device, or other security related devices. Generally, these sound, security, or other systems require line of sight operation for best results. For example, a powered loudspeaker produces optimal audio results when the acoustic waves have a direct path to a user's ear. Similarly, a security system produces optimal results when the security system has a direct path to the area in which it is monitoring. To this end, these systems are typically installed in upper level areas of building structures to enhance the systems' ability for line of sight operation. At lower level areas, the operation line of sight may be blocked by building structures such as walls, building furnishings, people, etc. The wirelessly controlled electric systems 200 may also be coupled to the outside of a building structure, such as an outer wall overlooking a café, seating area, parking lot, or storage area. The wirelessly controlled electric systems 200 may also be coupled to a supporting pole or other support structures, either inside or outside of a building structure.

Preexisting electric circuits located at or near the upper level areas may provide preexisting power sources 100 for the wirelessly controlled electric systems 200. The preexisting electric circuits typically include electric devices 106 that may also be located in the upper level areas of building structures. Therefore, the wirelessly controlled electric systems 200 may be installed in proximity to these electric devices 106. For example, the connecting wires 112 connecting the adaptor 110 and the wirelessly controlled electric system 200 may be equal to 5 feet, such that the wirelessly controlled electric system 200 may be installed within 5 feet of the electric device 106. Smaller lengths, such as 1 foot may also be used, including a minimal length where the adaptor 110 and the wirelessly controlled electric system 200 are contained within a single housing. In this example, the electric device 106 may be coupled to the single housing. Larger lengths may also be used, for example, in industrial locations where the length between the adaptor 110 and the wirelessly controlled electric system 200 may exceed 50 feet. Moreover, if there are no proximally located electric circuits, the length between the adaptor 110 and the wirelessly controlled electric system 200 may also need to be greater in order for the wirelessly controlled electric system 200 to parasitically utilize the most conveniently located preexisting power source 100. A protective conduit or cover may be provided to cover and protect the connecting wires 112 or other conductive material connecting the adaptor 110 and wirelessly controlled electric system 200.

Figure 4:
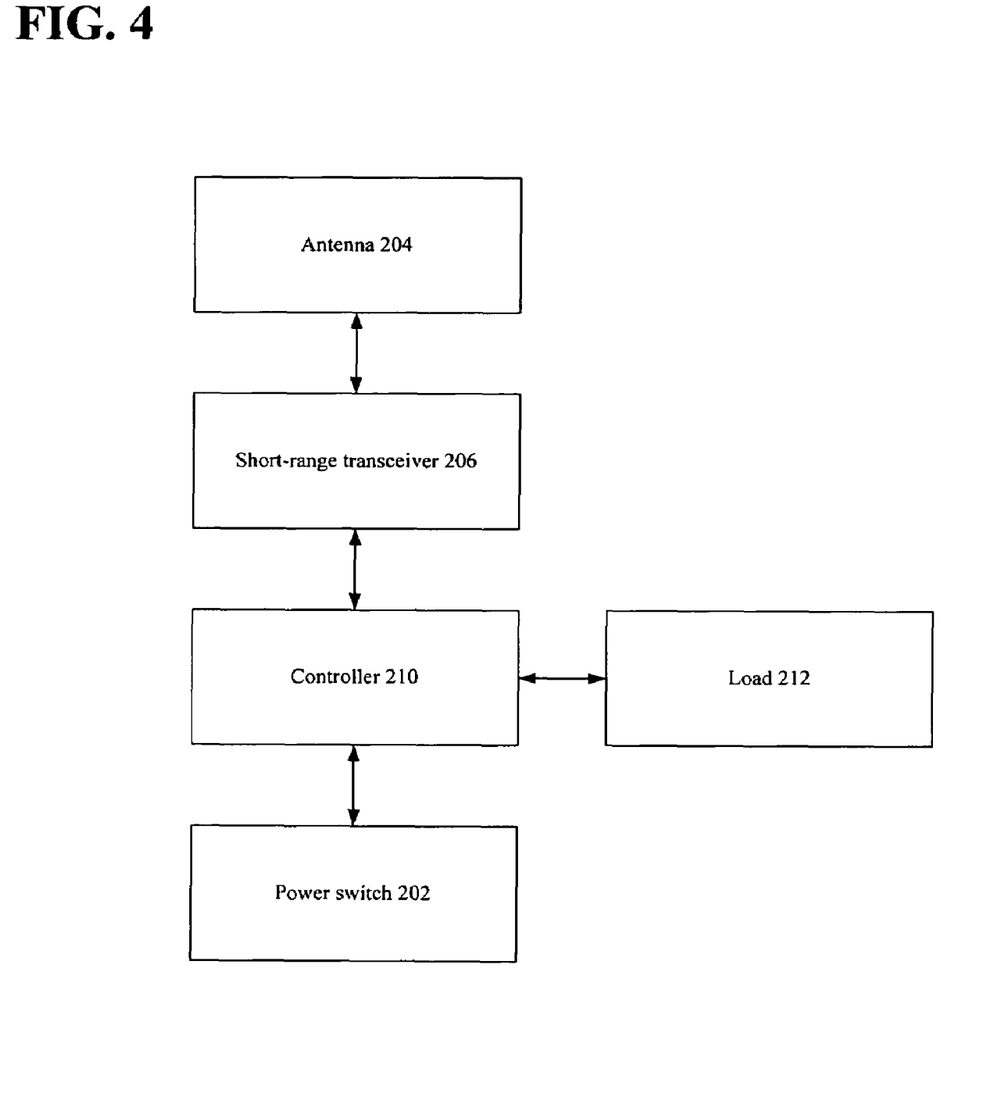
FIG. 4 is a block diagram of an exemplary wirelessly controlled electric system.

A block diagram of a wirelessly controlled electric system 200 is shown in FIG. 4. As described, the wirelessly controlled electric system 200 takes as input the current and voltage of a preexisting power source 100. The wirelessly controlled electric system 200 may include an antenna 204, a short-range transceiver 206, a controller 210, and a power switch 202. The wirelessly controlled electric system 200 may also include, as pointed out above, a sound system, a security system, or other systems or a combination of the systems, which is represented by load 212. The wirelessly controlled electric system 200 may also be adapted to be coupled a load 212.

The antenna 204 and short-range transceiver 206 may be in wireless communication with other wireless devices within the system 10 or outside the system 10 up to a distance of 50 feet. Longer distances may be utilized, for example, in industrial purposes. For example, the antenna 204 and short-range transceiver 206 may receive wireless signals from wireless devices, such as the electric system controller 400 and a wireless switch 302, discussed below. The controller 210 may process the information received by the antenna 204 and short-range transceiver 206. The controller 210 may also control the output and operation of the load 212 and may direct the power switch 202 between a conducting state and a non-conducting state. The power switch 202 is discussed below.

The electric system controller 400 of system 10, shown in FIG. 1, may direct the operation of the wirelessly controlled electric system 200 via wireless control signals. The electric system controller 400 may include an audio generator, a video generator, an audio receiver, a video receiver, a computing device, or combinations thereof. For example, the electric system controller 400 may include a CD or MP3 player, a DVD player, a satellite radio receiver, a satellite television receiver, a microphone input, or a computing device. If the wirelessly controlled electric system 200 includes a monitoring input such as a camera to a security system, the electric system controller 400 may include a display for displaying the information that is being monitored by the wirelessly controlled electric system 200. The electric system controller 400 may also include known recording means for recording the monitored information. The electric system controller 400 may be powered via a power outlet. The operation of the electric system controller 400 may also be controlled by a separate wireless device (not shown), such as a remote control device. The separate wireless device may also wirelessly control the operation of the wirelessly controlled electric system 200 with wireless control signals transmitted from the electric system controller 400 to the wirelessly controlled electric system 200.

Figure 5:
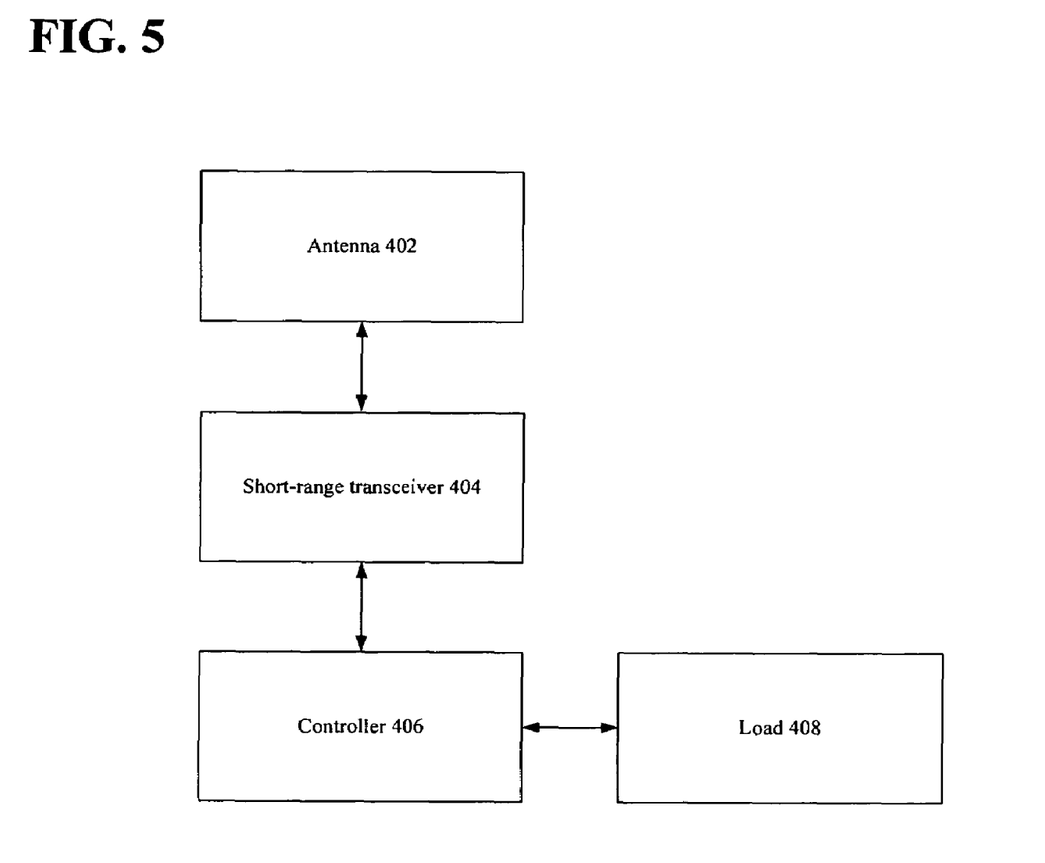
FIG. 5 is a block diagram of an exemplary electric system controller.

A block diagram of an electric system controller 400 is shown in FIG. 5. The electric system controller 400 may receive an input current and voltage from an external power source, such as a power outlet. The electric system controller 400 may include an antenna 402, a short-range transceiver 404, and a controller 406. The electric system controller 400 may also include, as pointed out above, an audio generator, a video generator, an audio receiver, a video receiver, a computing device, or combinations thereof, which is represented by load 408. The antenna 402 and short-range transceiver 404 may be in wireless communication with other wireless devices within the system 10 or outside the system 10 up to a distance of 50 feet. Longer distances may be utilized, for example, in industrial purposes. For example, the antenna 402 and short-range transceiver 404 may receive wireless signals from wireless devices, such as a remote control device and the wireless switch 302, discussed below. The antenna 402 and short-range transceiver 404 may also output wireless signals to the wirelessly controlled electric system 200. The controller 406 processes the information received by the antenna 402 and short-range transceiver 404. The controller 406 may also control the output and operation of the load 408.

The electric system controller 400 may be located in lower level areas accessible by a user. The electric system controller 400 may, therefore, provide a convenient method for directing the operations of the wirelessly controlled electric system 200. In addition to receiving wireless signals, the user may manually enter commands into the electric system controller 400. The commands may then be wirelessly transmitted to the wirelessly controlled electric system 200. For example, if the electric system controller 400 includes a CD player and the wirelessly controlled electric system 200 includes a powered loudspeaker, the user may enter commands into the CD player and the electric system controller 400 may wirelessly control the output of the loudspeaker.

Once the adaptor 110 is coupled to a preexisting power source 100 and intercepts the preexisting electric circuit, the preexisting switch 102 may be placed in a conducting state when the wirelessly controlled electric system 200 is in use. If the preexisting switch 102 is not in a conducting state, the wirelessly controlled electric system 200 may lose the electrical connection to the preexisting power source 100. In order to retain the power control over the electric device 106 independent of the wirelessly controlled electric system 200, the system 10 provides a power switch 202. In the example of FIG. 1, the power switch 202 is located within the housing 208 of the wirelessly controlled electric system 200. The power switch 202 may also be located outside the housing 208 and have a separate housing (not shown). The power switch 202 may include any device for making, breaking, or changing the connections in an electrical circuit. In one example, the power switch 202 is an electrical switch that opens and closes under the control of another electrical circuit, such as a relay switch.

Following the path of the power wiring 108 shown in the example of FIG. 1, the power wiring 108 routes through the adaptor 110 and into the internal power input of the wirelessly controlled electric system 200. The power switch 202 connects to the power wiring 108 and controls an electric device power wire 114 that supplies power to the electric device 106. If the power switch 202 is in a conducting state then the electric device 106 receives power via the power wire 114 from the preexisting power source 100. On the other hand, if the power switch 202 is not in a conducting state, then the electric connection between the electric device 106 and the preexisting power source 100 is broken and the electric device 106 does not receive power from the preexisting power source 100. Thus, the preexisting switch 102 may remain in its conducting state so that the wirelessly controlled electric system 200 may receive power from the preexisting power source 100 and the user may retain the switching control of the electric device 106 via the power switch 202. The functionality of the preexisting switch 102 in controlling the power to the electric device 106 may be effectively transferred to the power switch 202.

Figure 6:
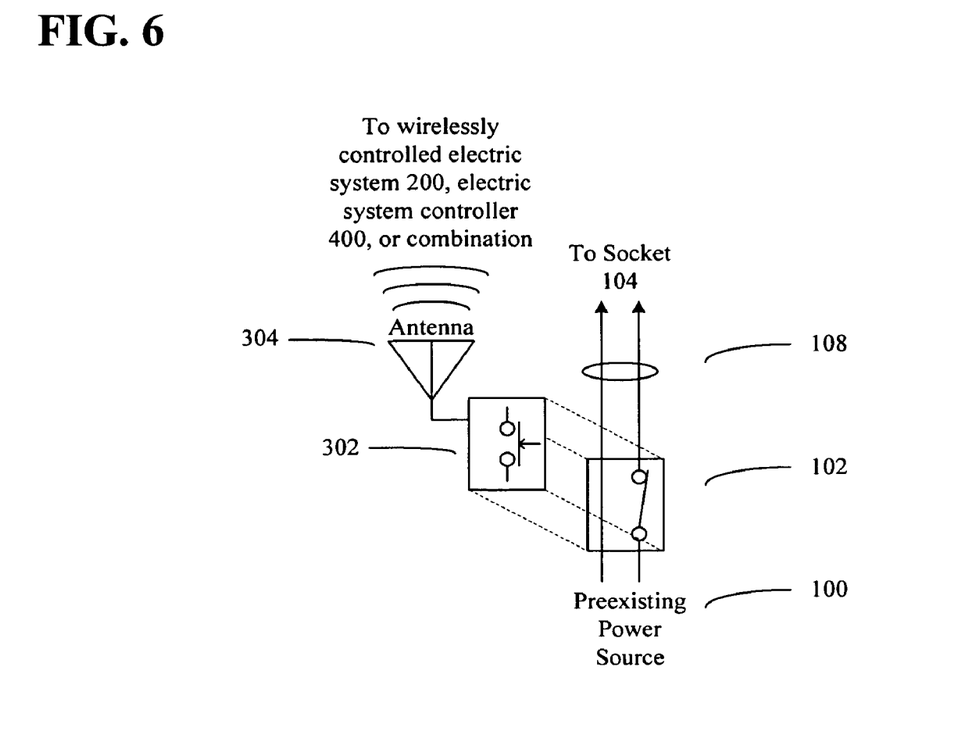
FIG. 6 is an illustration of an exemplary wireless switch.

The electric system controller 400 may wirelessly communicate with the wirelessly controlled electric system 200 to direct the power switch 202 between a conducting and a non-conducting state. The user may also manually direct the power switch 202 to control the power to the electric device 106; however, this may not be a convenient method of directing since the wirelessly controlled electric system 200 may be located in upper level areas of a building structure that are outside the direct accessibility of the user. In addition, because the wirelessly controlled electric system 200 is typically located in upper levels of building structures, the power switch 202 may be located a distance from the preexisting switch 102. The user may, however, wish to retain control of the electric device 106 at the original location of the preexisting switch 102. The system 10 therefore may provide a second additional switch, a wireless switch 302. An example of the wireless switch 302 is shown in FIG. 6. The wireless switch 302 may be in wireless communication with the power switch 202 to direct the power switch 202 between a conducting and a non-conducting state.

The wireless switch 302 may be in wireless communication with the power switch 202 via a short-range transmitter (not shown) and a wireless antenna 304. The surface of the wireless switch 302 may be a plate configured as a wireless antenna. A separate wireless antenna may also be used. The short-range transmitter may be in wireless communication with the wirelessly controlled electric system 200 and/or the electric system controller 400 up to a distance of 50 feet. Longer distances, however, may be utilized, for example, in industrial purposes. For example, the wireless switch 302 may be in wireless communication with either the electric system controller 400 via the antenna 402 and short-range transceiver 404 and/or the wirelessly controlled electric system 200 via the antenna 204 and short-range transceiver 206.

The short-range transmitter may be powered by a small battery (not shown) such as a coin cell battery, which may be included in the wireless switch 302. Otherwise, if the size of the wireless switch 302 permits, the wireless switch 302 may be powered by a larger type battery. While the wireless switch 302 may include any device for making, breaking, or changing the connections in an electric circuit, in one example, the wireless switch 302 may be a push-button switch to conserve battery power consumption due to the transient nature of the wireless signal.

The wireless switch 302 may be in wireless communication with the power switch 202 by communicating directly with the wirelessly controlled electric system 200. If, however, the wireless switch 302 does not have a direct wireless signal path to the wirelessly controlled electric system 200, the wireless switch 302 may wirelessly communicate with the electric system controller 400. Moreover, if more signaling power is necessary than the short-range transmitter on the wireless switch 302 may provide, such as in the case where the wirelessly controlled electric system 200 is located a great distance from the wireless switch 302, then the wireless switch 302 may communicate with the electric system controller 400. The electric system controller 400 may then transmit the wireless signal to the wirelessly controlled electric system 200. Typically, the electric system controller 400 may provide more signaling power than the wireless switch 302. Either way, the wireless switch 302 enables the user to retain power control of the electric device 106 at the same location as the preexisting switch 102. The wireless switch 302 may, however, be positioned in any location the user desires to have convenient power control over the electric device 106.

The wireless switch 302 may be adapted to be coupled to the preexisting switch 102. The wireless switch 302 may be a cover that may be placed over the preexisting switch 102. The wireless switch 302 may be coupled to the preexisting switch 102 by an adhesive, such as foam tape, or by replacing the cover-plate screws of the preexisting switch 102 with replacement screws that are able to attach both the wireless switch 302 and the preexisting switch 102 to a supporting structure. In this regard, the wireless switch 302 serves two purposes, it wirelessly directs the conductive state of the power switch 202 and it acts as a protective cover to ensure that the preexisting switch 102 remains in a conducting state.

Figure 7:
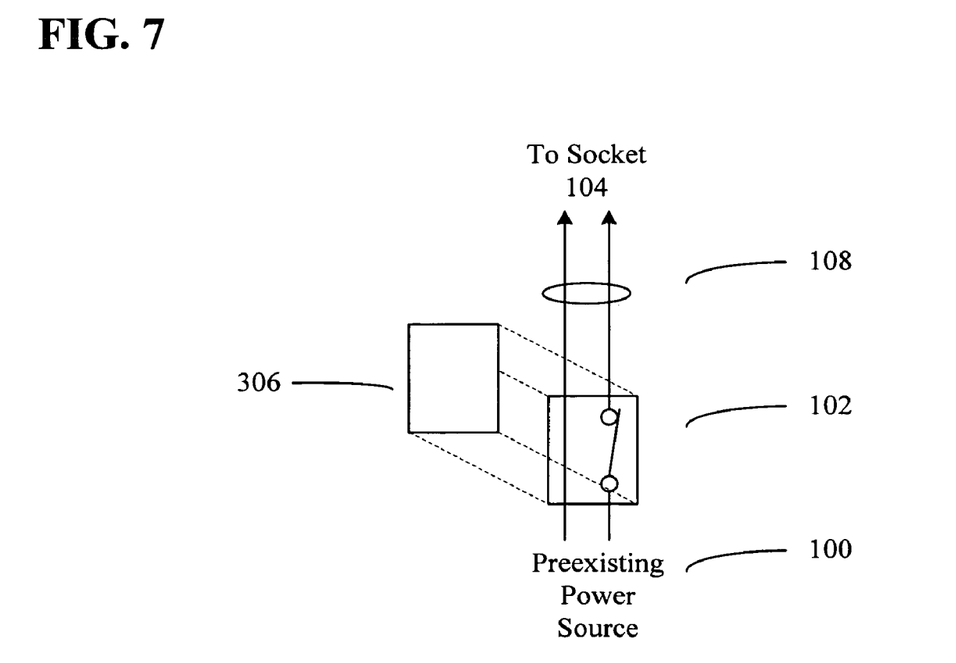
FIG. 7 is an illustration of an exemplary preexisting switch cover.

The preexisting switch 102 may also be disabled or mechanically prevented from being placed in a non-conducting state, such as by a locking mechanism. Alternatively, the preexisting switch 102 may be covered by a simple cover 306 that does not include a switch. A simple cover 306 is shown in FIG. 7. The simple cover 306 may be coupled to the preexisting switch 102 as described above. In one example, all preexisting switches 102 contained within the preexisting electric circuit utilized by the system 10 may be prevented in one of the above mentioned ways to ensure the switches 102 remain in a conducting state and thus do not impede the power input to the wirelessly controlled electric system 200.

Figure 8:
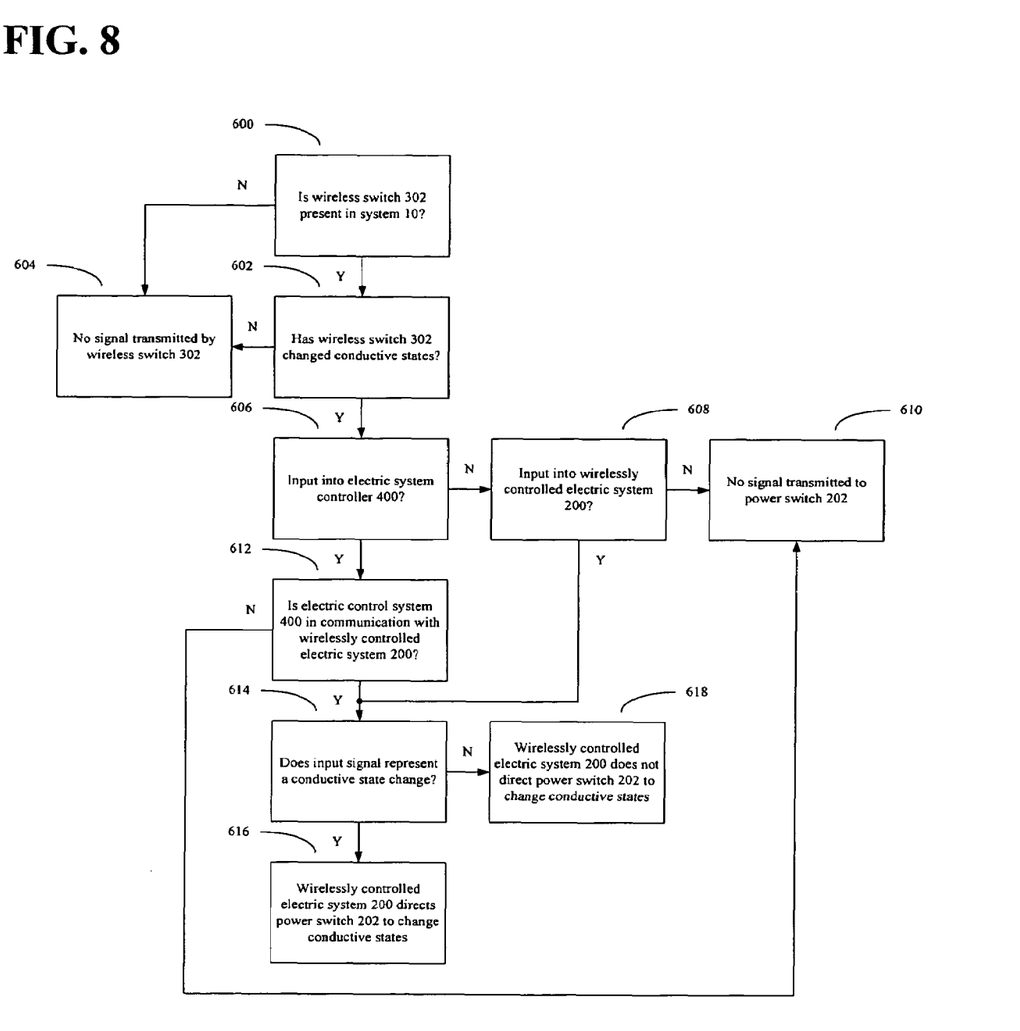
FIG. 8 is a flow chart of an exemplary logic for determining the conductive state of an exemplary power switch.

The operation and interaction of the switches with the other components in the system 10 is shown in FIG. 8. The presence of the wireless switch 302 is optional in system 10, as represented by act 600. The user my instead choose to cover the preexisting switch 102 by a simple cover 306, discussed above. The user may also choose not to use a protective cover, but rather manually place the preexisting switch 102 in a conductive state whenever use of the wirelessly controlled electric system 200 is desired. If the wireless switch 302 is contained within the system 10, then the switch 302 may send a wireless signal each time the conductive state of the switch 302 changes (602). If the wireless switch 302 does not change conductive states, then no signal is transmitted by the switch (604).

If the wireless switch 302 does change conductive states, then the wireless signal may be transmitted to the electric system controller 400 (606). The wireless signal may also be transmitted directly to the wirelessly controlled electric system 200 (608). If the wireless switch 302 is not in communication with the electric system controller 400 or the wirelessly controlled electric system 200, then the wireless switch 302 may not direct the conductive state of the power switch 202 (610). The wireless switch 302 may, however, directly communicate with the power switch 202 in the example where the power switch 202 is separate from the wirelessly controlled electric system 200 (not shown). The wireless signal from the wireless switch 302 may also be in communication with signal repeaters or extenders (not shown). These wireless devices may then direct the wireless signal to the electric system controller 400 or to the wirelessly controlled electric system 200.

If the wireless signal is transmitted to the electric system controller 400, the electric system controller 400 may transmit the wireless signal to the wirelessly controlled electric system 200. However, if the electric system controller 400 is not in communication with the wirelessly controlled electric system 200, then the wireless switch 302 may not direct the conductive state of the power switch 202 (610). Examples of where the electric system controller 400 may not be in communication with the wirelessly controlled electric system 200 may be where the electric system controller 400 or the wirelessly controlled electric system 200 is powered off, or a structure is obstructing the signal path between the electric system controller 400 and the wirelessly controlled electric system 200.

When the signal is received by the wirelessly controlled electric system 200 the controller 210 may determine whether the input signal represents a conductive state change for the power switch 202 (614). If the signal represents a conductive state change, then the controller 210 of the wirelessly controlled electric system 200 may direct the power switch 202 to change conductive states (616). For example, if the power switch 202 is in a conducting state and the user places the wireless switch 302 in a non-conducting state, then the controller 210, in response to the wireless signal from the wireless switch 302, may direct the power switch 202 to change from a conducting to a non-conducting state. Alternatively, if the signal does not represent a conductive state change, then the controller 210 of the wirelessly controlled electric system 200 does not direct the power switch 202 to change conductive states (618).

Moreover, the user may direct the power switch 202 by direct input into the electric system controller 400 and/or the wirelessly controlled electric system 200. Input into the electric system controller 400 may control the operations of the electric system controller 400. The input may also be wirelessly transmitted to the wirelessly controlled electric system 200 to control the operations of the wirelessly controlled electric system 200 and/or direct the power switch 202. Input into the wirelessly controlled electric system 200 may control the operations of the wirelessly controlled electric system 200 and/or direct the power switch 202.

Figure 9:
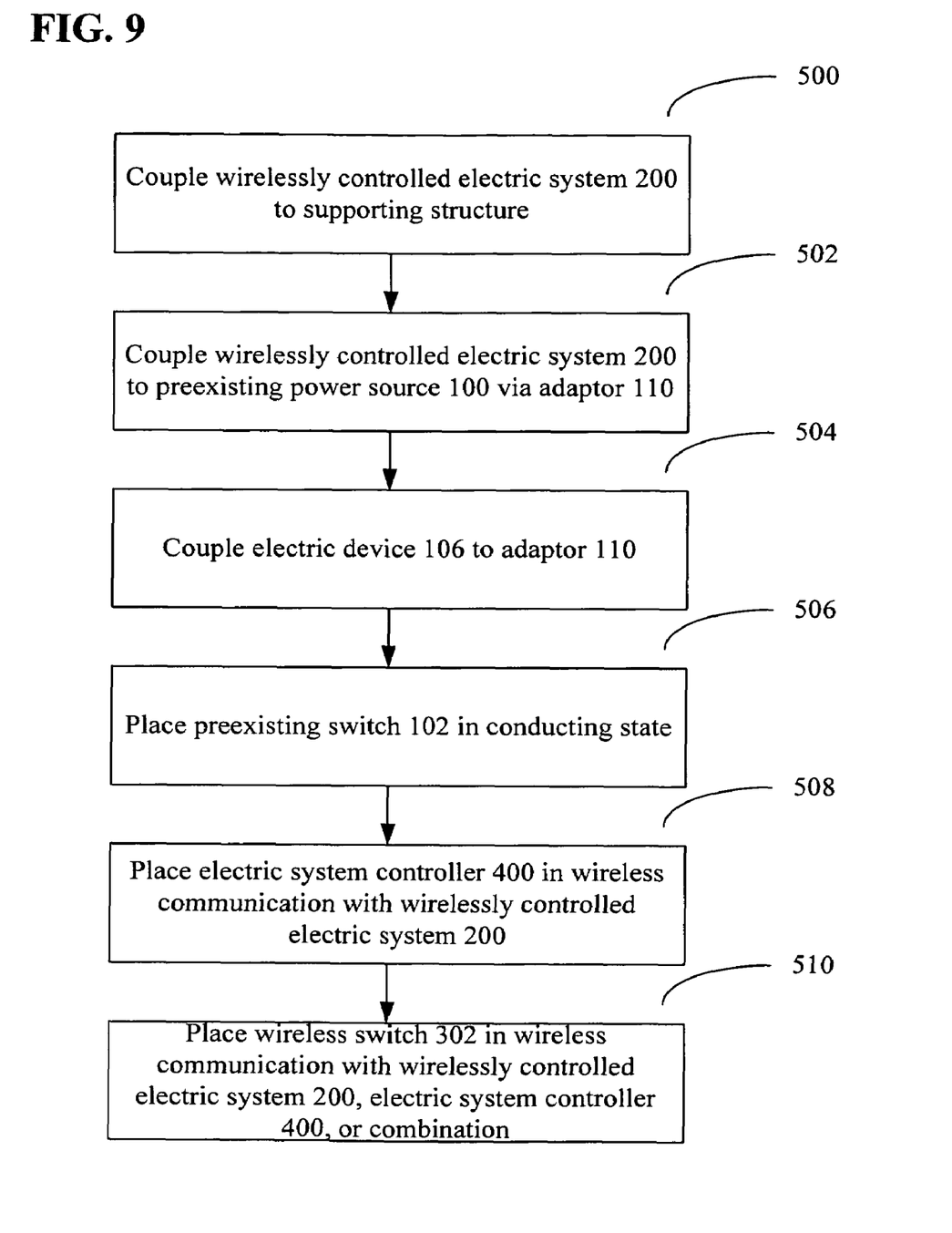
FIG. 9 is a flow chart of an exemplary system for powering a wireless system from preexisting power.

A flow chart of the system 10 is shown in FIG. 9. In act 500, the wirelessly controlled electric system 200 is coupled to a supporting structure. For example, the wirelessly controlled electric system 200 may be coupled to a light socket located in an upper lever surface of a building structure. In act 502, the adaptor 110 is coupled to the preexisting power source 100. The wirelessly controlled electric system 200 is adapted to receive power from the preexisting power source 100 via the adaptor 110. In act 504, the electric device 106 is coupled to the adaptor 110. The power supplied to the electric device 106 may be selectively controlled by the power switch 202 contained within system 10. In act 506, the preexisting switch 102, if one exists in the preexisting electric circuit, is placed in a conducting state. The wirelessly controlled electric system 200 may therefore receive power from the preexisting power source 100. In act 508, an electric system controller 400 is placed in wireless communication with the wirelessly controlled electric system 200. The electric system controller 400 may direct the operations of the wirelessly controlled electric system 200 via wireless control signals and may also independently direct the conductive state of the power switch 202 via separate wireless signals to selectively power the electric device 106. The electric system controller 400 may be in continuous wireless communication with the wirelessly controlled electric system 200. In act 510, a wireless switch 302 may be placed in wireless communication with the wirelessly controlled electric system 200 to directly control the conductive state of the power switch 202 or the wireless switch 302 may be placed in wireless communication with the electric system controller 400 to indirectly control the conductive state of the power switch 202.

The components of system 10 may wirelessly communicate using independent, selectable channels. The components may also be assigned unique identification codes to communicate on a common channel. The components may communicate where each component has an independent data stream. The components may communicate using encoded data streams. The communicated data may be compressed to reduce bandwidth use. The communicated data may be encrypted for security purposes. For example, in some cases, two or more systems 10 may be located within wireless communication of each other or a system 10 may be within wireless communication of other wireless devices. Employing the above wireless communication methods, and other known methods, will allow the system 10 and other wireless devices to simultaneously communicate without confusing signals.

The components of the system 10 may also communicate using any portion of the electromagnetic spectrum. In one example, the system 10 utilizes radio frequency wavelength communication. Specifically, the electric system controller 400 may be adapted to wirelessly communicate with the wirelessly controlled electric system 200 via radio frequency wavelengths. Similarly, the wireless switch 302 may be adapted to wirelessly communicate with the wirelessly controlled electric system 200 and/or the electric system controller 400 via radio frequency wavelengths. Radio frequency wavelengths may pass through walls and opaque objects, whereas infrared wavelengths suffer high attenuation when opaque walls and other obstacles block the line-of-site between the wirelessly communicating devices, such as the wireless switch 302 and electric system controller 400.

The system 10 may provide an increase in power control to preexisting electric devices 106 on a preexisting electric circuit. For example, where the circuit includes a single preexisting switch 102 and two or more light generation sources (electric devices 106), a system 10 may be installed for each light generation source. In that regard, each light generation source would be coupled to an adaptor 110 and selectively powered by the power switch 202. As a result, instead of having a single preexisting switch 102 to selectively direct the power to the two or more light generation sources, the power may be directed to each light generation source independently via the power switches 202. The user may, for example, have a remote control device for controlling the conductive state of each power switch 202 individually and therefore selectively power each light generation source individually. The number of systems 10 installed in the above described preexisting electric circuit may vary as desired, such that only one system 10 may be installed to selectively power a single light generation source independently from the other sources on the same circuit. Moreover, the power switch 202 may be adapted to control the power to a single electric device 106 or multiple electric devices 106. For example, two or more electric devices 106 may be coupled to a single adaptor 110 and thus be selectively powered by the power switch 202.

The system 10 may provide dimming capabilities to preexisting light generation sources (electric devices 106) that are currently wired as fully-on and fully-off. In other words, the preexisting switch 102 that either supplies power or stops the supply of power to the light generation sources may be replaced by the system 10. The power switch 202 of system 10 may include a dimming function, such that the user may selectively power and dim the light generation sources. A wireless device, such as a remote control device, may direct the dimming power switch 202 to allow the user to dim the light generation sources. Moreover, the wireless switch 302 may be a push button switch to wirelessly direct the dimming power switch 202. The user may press and hold the push button switch to activate the dimming function of the power switch 202. In this regard, a user may add a dimming function to existing light generation sources by installing a system 10 into the preexisting electric circuit that supplies power to the sources.

The system 10 may provide noise sensing capabilities to determine the output signal of an audio system. For example, the wirelessly controlled electric system 200 may include a powered loudspeaker and a microphone. The microphone may sense the noise levels within an environment and adjust the output level of the powered loudspeaker to overcome the determined noise levels. In this regard, the system 10 may perform an automatic volume control based on the noise levels of the surrounding environment. Thus, the system 10 may be implemented in, for example, a restaurant where the noise levels are constantly changing based on the number of people dining in the restaurant at any given time. The system 10 may alleviate the need for continuous monitoring of the audio output levels within the restaurant.

The system 10 may provide a combination of a sound and a security system. For example, the wirelessly controlled electric system 200 may include a transmitter, such as a powered loudspeaker, and a receiver, such as a microphone. The loudspeaker may emit an acoustic wave over a predetermined area that may be reflected by structures within the area and received by the microphone. The received signal may be processed by known methods to produce an energy signal as a function of time. This energy signal may be displayed, for example, on the electric system controller 400 as an energy-time curve.

The system 10 may occasionally emit or sweep the monitored area with acoustic waves and analyze the resultant energy-time curves for any discrepancies within the curve. These discrepancies may signify a change in the placement of structures or objects within the area and thus may signify movement within the area. If movement is detected, the system 10 may output an alarm via the loudspeaker to warn of a potential trespasser. The system 10 may also wirelessly transmit an alarm signal via either short-range transceiver (206, 404) to a designated security base, within the transmitting constraints of the short-range transceivers. The system 10 may therefore be used by a business as an audio system during business hours and as a security system after business hours.

The system 10 may be used within a network. For example, the electric system controller 400 may be part of a network of other electric system controllers 400. The multiple electric system controllers 400 may wirelessly communicate with a single wirelessly controlled electric system 200. Alternatively, a single electric system controller 400 may wirelessly communicate with multiple wirelessly controlled electric systems 200. The single electric system controller 400 may communicate with a particular wirelessly controlled electric system 200 in such a manner as to exclude other wirelessly controlled electric systems 200.

The system 10 enables installation with minimal tool use and labor. The components described herein may include easily attachable mounting brackets and snap-together surface wiring conduit for the adaptor 110, wirelessly controlled electric system 200, and wireless switch 302. The system 10 may therefore be installed by untrained individuals. In addition, it is recommended that the preexisting power source 100 be checked before installation of the system 10 to determine whether the preexisting power source 100 may be capable of supplying adequate power to both the wirelessly controlled electric system 200 and the electric device 106. Oftentimes, preexisting lighting circuits support more current than needed by the light generation sources alone. Moreover, light generation sources are generally located near the upper level areas of a building structure. Thus, these preexisting lighting circuits may provide adequate power for the wirelessly controlled electric system 200 to parasitically utilize.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for powering a wirelessly controlled electric system via a preexisting power source, the system comprising:
    an adaptor electrically adapted to be coupled to a preexisting power source;
    a wirelessly controlled electric system including a load, the wirelessly controlled electric system electrically coupled with the adaptor and operable to receive power from the preexisting power source; and
    an electric system controller in wireless communication with the wirelessly controlled electric system;
    where the preexisting power source is operable to power at least one preexisting electric device, and
    where the wirelessly controlled electric system comprises a switch operable to control the supply of power from the preexisting power source to the at least one preexisting electric device.

2. The system of claim 1 where the load comprises at least one of a sound system, a security system, or combinations thereof.

3. The system of claim 1 where the adaptor comprises a first end and a second end, where the first end is adapted to be coupled to a light socket and where the second end is adapted to be coupled to a light generation source.

4. The system of claim 1 where the adaptor comprises a first end and a second end, where the first end is adapted to be coupled to an electric receptacle and where the second end is adapted to receive a plug.

5. The system of claim 1 where the switch is configured to be wirelessly directed between a conducting state and a non-conducting state by the electric system controller.

6. The system of claim 1 where the switch is a first switch, the system further comprising:
a second switch, where the second switch is adapted to wirelessly communicate with the electric system controller to direct the first switch between a conducting state and a non-conducting state.

7. The system of claim 1 where the switch is a first switch, the system further comprising:
a second switch, where the second switch is adapted to wirelessly communicate with the wirelessly controlled electric system to direct the first switch between a conducting state and a non-conducting state.

8. The system of claim 1 where the switch is a first switch, the system further comprising:
a second switch, where the wirelessly controlled electric system is configured to receive a wireless signal from the second switch either directly, or indirectly via the electric system controller, and where the wirelessly controlled electric system is configured to direct the first switch between a conducting state and a non- conducting state in response to the wireless signal.

9. The system of claim 1 where the wirelessly controlled electric system is a first wirelessly controlled electric system, the system further comprising:
a second wirelessly controlled electric system electrically coupled with the adaptor and operable to receive power from the preexisting power source, where the electric system controller is configured to be in wireless communication with the first and second wirelessly controlled electric systems.

10. The system of claim 1 where the adaptor is insertable between the at least one preexisting electric device and the preexisting power source.

11. The system of claim 1 where the electric system controller comprises multiple electric system controllers.

12. The system of claim 1 where the at least one preexisting electric device comprises a plurality of preexisting electric devices, and where the switch is configured to selectively power the plurality of preexisting electric devices as directed by a wireless signal receivable by the wirelessly controlled electric system.

13. The system of claim 1 where the load comprises a microphone and a powered loudspeaker, where the microphone is configured to sense noise levels within an environment and operable to adjust an output of the powered loudspeaker according to the noise levels.

14. The system of claim 1 where the wirelessly controlled electric system is operable to receive power from the preexisting power source via the adaptor, and supply the received power to the load.

15. The system of claim 1 where the switch is operable to control the supply of power from the preexisting power source to the at least one preexisting electric device independent of the load.

16. The system of claim 1 where the preexisting power source is operable to power at least one preexisting electric device via the adaptor and the wirelessly controlled electric system.

17. A method for powering a wirelessly controlled electric system via a preexisting power source, the method comprising:
coupling a wirelessly controlled electric system between at least one preexisting electric device and a preexisting power source, the wirelessly controlled electric system comprising a load and operable to receive power from the preexisting power source;
switching the received power to selectively power the at least one preexisting electric device with the preexisting power source;
directing the switching in response to a first wireless signal receivable by the wirelessly controlled electric system; and
controlling the load with a second wireless signal transmittable by an electric system controller.

18. The method of claim 17 where the load comprises at least one of a sound system, a security system, or combinations thereof.

19. The method of claim 17 where the step of coupling further comprises coupling an adaptor between the at least one preexisting electric device and the preexisting power source, and where the wirelessly controlled electric system is coupled to the adaptor.

20. The method of claim 17 where the first wireless signal is transmitted by the electric system controller.

21. The method of claim 17 where the first wireless signal is transmitted by a wireless switch.

22. The method of claim 17 where a wireless switch wirelessly communicates with the electric system controller, and where the electric system controller transmits the first wireless signal to direct the switching in response to the wireless switch.

23. The method of claim 17 where the at least one preexisting electric device comprises a plurality of preexisting electric devices, the step of switching further comprising:
switching the received power from the preexisting power source to direct the power to the plurality of preexisting electric devices.

24. The method of claim 17 further comprising:
coupling the wirelessly controlled electric system to a light socket in an upper level surface of a building structure.

25. The method of claim 17, further comprising the wirelessly controlled electric system receiving power from the preexisting power source and providing the power from the pre-existing power source to the load.

26. The method of claim 25, wherein switching the received power comprises the wirelessly controlled electric system switching the received power to selectively power the at least one preexisting electric device and independently controlling the load, the power to the load provided from the pre-existing power source to the load via the wirelessly controlled electric system.

27. A system for powering a wirelessly controlled electric system via a preexisting power source, the system comprising:
coupling means for coupling a wirelessly controlled electric system between at least one preexisting electric device and a preexisting power source, the wirelessly controlled electric system comprising a switch and adapted to be coupled to a load;
the wirelessly controlled electric system operable to direct the switch between a conducting state and a non-conducting state, the switch being operable to control the supply of power from the preexisting power source to the at least one preexisting electric device; and
an electric system controller in wireless communication with the wirelessly controlled electric system, the electric system controller being operable to control the load;
where the wirelessly controlled electric system is operable to receive power from the preexisting power source via the coupling means.

28. The system of claim 27 where the load comprises at least one of a sound system, a security system, or combinations thereof.

29. The system of claim 27 where the coupling means comprises an adaptor electrically adapted to be coupled between the at least one preexisting electric device and the preexisting power source, and where the wirelessly controlled electric system is adapted to be coupled to the adaptor.

* * * * *